United States Patent [19]
McClure

[11] Patent Number: 5,678,582
[45] Date of Patent: Oct. 21, 1997

[54] SKATE BEARING MAINTENANCE

[76] Inventor: Charles Laird McClure, 757 S. Warren Ave., Malvern, Pa. 19355

[21] Appl. No.: 588,139

[22] Filed: Jan. 18, 1996

[51] Int. Cl.⁶ .................................................. B08B 13/00
[52] U.S. Cl. ...................... 134/116; 134/149; 134/157; 134/201
[58] Field of Search ............................. 134/43, 116, 123, 134/140, 149, 152, 157, 201; 279/2.2, 129, 131; 15/160, 179, 182

[56]         References Cited
          U.S. PATENT DOCUMENTS

| | | | |
|---|---|---|---|
| 1,766,208 | 6/1930 | Anstiss | 134/116 |
| 1,878,277 | 9/1932 | Hodge | 134/116 |
| 1,894,786 | 1/1933 | Pew | 134/116 |
| 2,369,498 | 2/1945 | Streuber | 134/116 |
| 2,484,149 | 10/1949 | Bousky | 134/116 |
| 2,493,291 | 1/1950 | Hirsch | 134/116 |
| 2,542,491 | 2/1951 | Engel | 134/149 |
| 2,549,837 | 4/1951 | Merrit | 134/116 |
| 2,602,672 | 7/1952 | Wiard | 279/131 |
| 2,652,350 | 9/1953 | Dailey | 134/149 |
| 2,652,843 | 9/1953 | Schuchman et al. | 134/116 |
| 2,832,682 | 2/1958 | Coulter | 134/116 |
| 3,482,584 | 12/1969 | Schipke | 134/116 |
| 3,672,256 | 6/1972 | Kosmowski . | |
| 5,450,646 | 9/1995 | McHugh | 15/179 |

*Primary Examiner*—Frankie L. Stinson
*Attorney, Agent, or Firm*—Charles A. McClure

[57]         ABSTRACT

Improved maintenance of skate bearings by means of a hand-tool adapted to rotate the ball bearings of an annular bearing assembly immersed in cleansing liquid to remove lubricant and contaminants. The tool is adapted to hold the outer annular race member of such a bearing assembly fixed and to hold the inner annular race member via its open center for rotation relative to the outer race member, thus rotating the ball bearings in the bearing assembly. Such rotational cleaning is conducive to extending the useful life of the bearings when subsequently re-oiled and re-installed in a skate wheel.

6 Claims, 4 Drawing Sheets 5,678,582

SKATE BEARING MAINTENANCE

TECHNICAL FIELD

This invention relates to skate bearing maintenance, especially means and methods for manipulating and cleaning bearing assemblies.

BACKGROUND OF THE INVENTION

The wheel bearings of roller skates with four wheels at corners of a foot-shaped skate frame were not too easily removed, as shown by Nastasi in his U.S. Pat. No. 3,781,485 for a roller skate bearing-extractor/replacer. The traditional roller skate now has significant competition from in-line skates, with only a single line of wheels. Hill in U.S. Pat. No. 5,271,633 discloses a frame for an in-line skate adapted to carry three, four, or five wheels, as well as readily removable bearings. A more recent skate bearing changer is disclosed in Zweekly U.S. Pat. No. 5,355,574.

The most popular new skates now have standard sizes of bearings to facilitate replacement of their plastic wheels, which usually wear out faster than bearings do. Yet, whether on sidewalk, street, racetrack, or in other settings, bearings inevitably become dirty. Gritty contaminants can slow a skater and can shorten bearing life. Bearings are also costly, so it is important to clean them, as now facilitated by the standardization of sizes. An all-purpose tool is disclosed by Chi in U.S. Pat. No. 5,365,811, who shows (FIGS. 6, 7) removal of press-fit roller bearing assemblies, as is conventional.

Yet, even standardized bearings, however readily removable from their skate wheels and axles, are difficult to clean effectively and promptly without getting oneself coated with dirt, lubricant, etc.

SUMMARY OF THE INVENTION

A primary object of the present invention is to simplify the maintenance of roller skate bearing assemblies.

Another object of this invention is to clean bearing assemblies of roller skates effectively and simply.

A further object of the invention is to improve the unpleasant and often ineffective aspects of cleaning skate bearing assemblies.

Yet another object of this invention is to provide apparatus to effectuate thorough cleaning of skate bearings.

A still further object of the invention is to accomplish the foregoing and related objects readily and economically.

In general, the objects of the present invention are attained in a maintenance method by removing a skate bearing assembly from its wheel, removing at least one dust cover from the assembly, mounting an uncovered bearing assembly on a rotation tool, immersing such bearing assembly into—and rotating it in—a cleansing liquid, after which it is dried, re-oiled, and re-installed in a wheel. More particularly, the bearing, which is annular, is held along its perimeter by fixed circumferential means and is held along its open center by rotatable axial means for rotation in the cleansing liquid and optionally in air to dry before being re-oiled and re-installed.

A preferred apparatus embodiment takes the form of a hand-tool having protruding means to grip the annular bearing assembly both circumferentially and axially for positive support and for rotation. The circumferential holding means has plural arcuate means flexible enough to surround the outer race and stiff enough to hold it fixed. The axial holding means comprises a plurality of parallel flexible portions adapted to extend through the open central portion of the inner race member and to flex centrifugally outward when rotating to grip it securely and so rotate it relative to the outer race member.

Other objects of this invention, together with methods and means for attaining the various objects, will become apparent from the following description and the accompanying diagrams of at least one embodiment, presented by way of example rather than limitation.

DESCRIPTION OF THE INVENTION

In the following description, like features in different views are denoted by the same reference numbers, and symmetrical items may have right portions denoted by an unprimed number and similar left portions denoted by a like number with a prime mark added.

Figure 1:
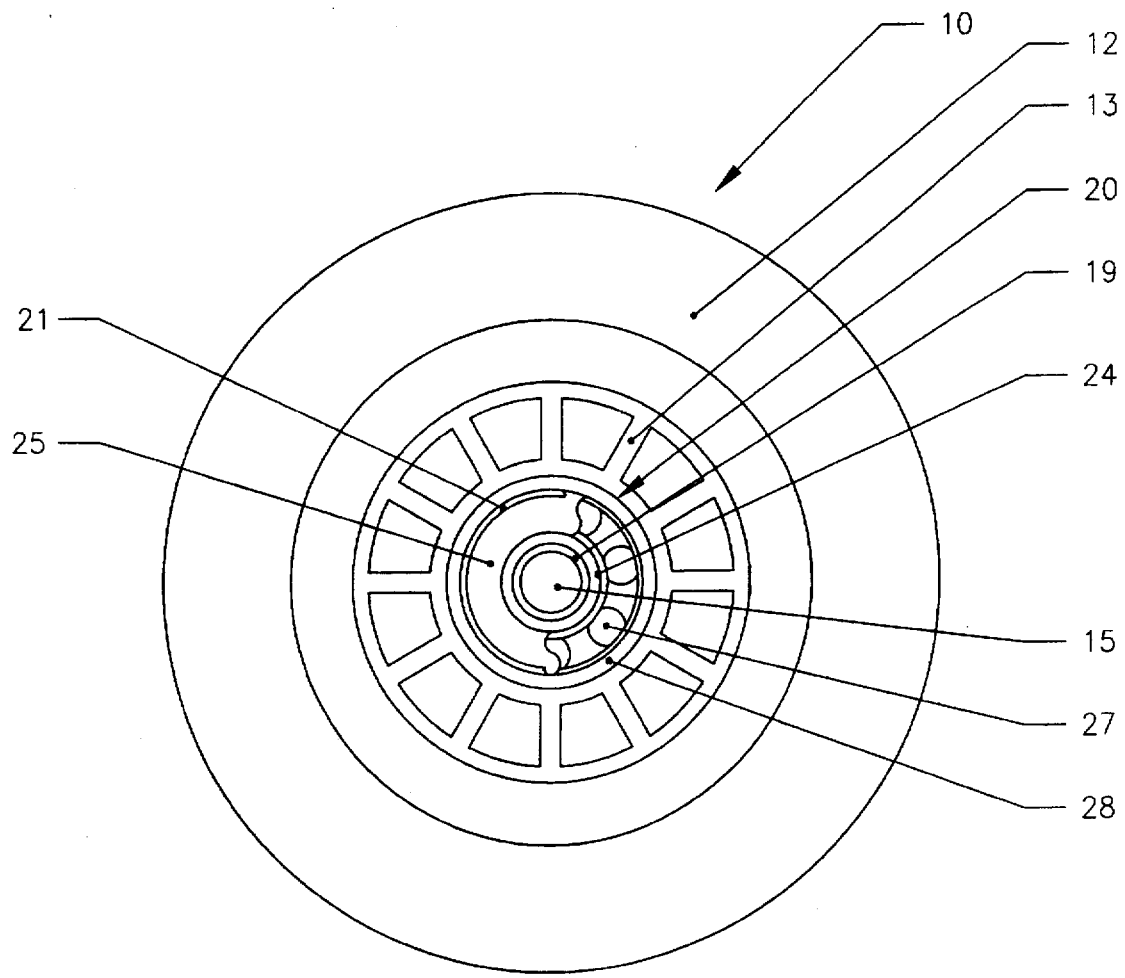
FIG. 1 is a side elevation of a skate wheel, with its bearing assemblies in place and the near bearing dust cover partly cut away, revealing ball bearings inside.

FIG. 1 shows, in side elevation, roller skate wheel assembly 10 (often just called a "wheel") in annular configuration, having tire 12 outermost, tapering in to hub 13 having spokelike configuration. The wheel has an identical pair of ball bearing assemblies, but only nearer bearing assembly 20 is visible here. The respective bearing assemblies are annular and are mounted on opposite end portions of sleevelike step bushing 19, whose near end portion is seen edge-on about circular axial bore 15. Dust cover 25 of bearing assembly 20 is partly cut away, revealing ball bearings 27 inside, evenly spaced circumferentially by their own retainer (not shown) within larger outer race member 28 and smaller inner race member 24. Dust covers are retained in place on both sides of each bearing assembly by an arcuate (C-shaped) flat retainer, visible dust cover 25 having such a retainer 21, fitting removably into a slot recessed into inside edges of the outer race member, as shown in the next view.

Figure 2:
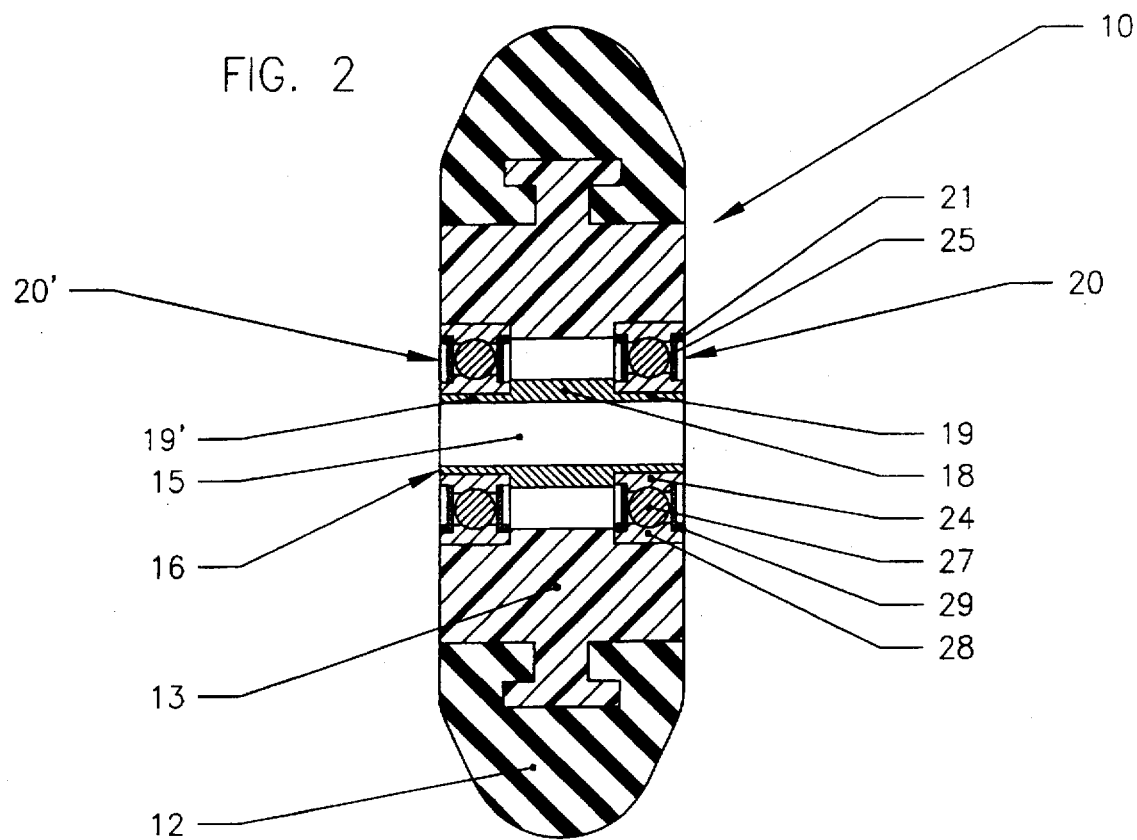
FIG. 2 is a medial transverse cross-section of the skate wheel of the preceding view, with its bearing assemblies in place.

FIG. 2 shows, in medial transverse cross-section, same annular wheel assembly 10 having outer tire portion 12 and inner hub portion 13 about the noted sleevelike bushing, having end portions 19, 19' and thicker intermediate portion 18 stepped radially outward from axial bore 15. Bearing assemblies 20, 20' fit snugly onto the thin end portions, and are spaced laterally apart by the thicker stepped portion, thereby placing the outermost sides of both of the bearing assemblies flush with the corresponding sides of the wheel.

Figure 3:
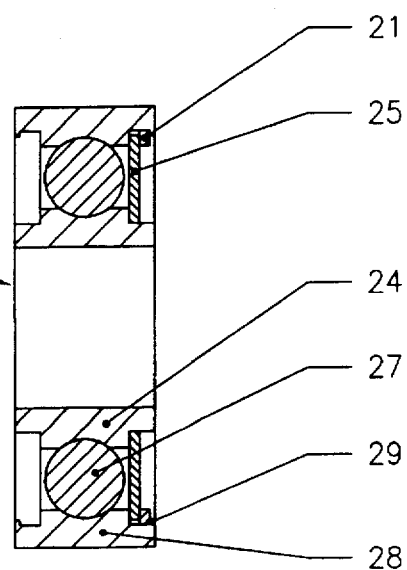
FIG. 3 is a medial transverse cross-section of such a bearing assembly with one dust cover in place, and the other cover removed.

FIG. 3 shows same bearing assembly 20 as in FIG. 2 in medial transverse cross-section, having been disassembled from the wheel and from sleevelike bushing 16, by being pushed out of contact with them, as by using a tool as shown by Chi in U.S. Pat. No. 5,365,811, or an equivalent pusher means such as a bolt. Right dust cover 25 remains, held in slotted outer race member 28 by its retainer 21.

Figure 4:
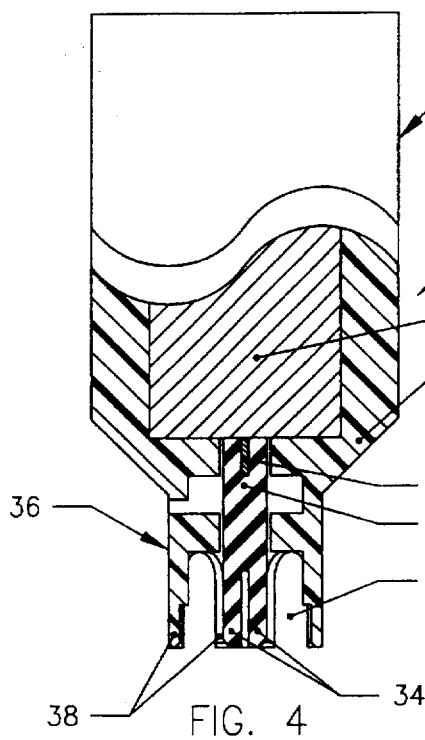
FIG. 4 is a side elevation of a tool of this invention, partly cut away in medial longitudinal cross-section, and shortened to save space of illustration.

FIG. 4 shows generally cylindrical hand-tool 30 of this invention inverted into use position, partly in side elevation but mostly in medial longitudinal cross-section. This hand-tool resembles an electric screw-driver and has generally cylindrical housing body 31 smaller cylindrical head portion 36 (here oriented downward) joined by intermediate tapered portion 33. The housing body (part of which is cut away to conserve drawing space) encloses motor 32, which has drive pin 39 extending downward into fingerlike axial means 38. The latter means protrudes into surrounding head portion 36 and ends subdivided into a plurality (quadrants shown here) of flexible holding means 34, which appear endwise in the next view. Affixed to the near end of the tool body is circumferential coaxial holding means 38 subdivided into a plurality (here, four) 45° arcuate pieces, mutually spaced 45° apart, spaced about the axial holding means, and relieved along their inner faces for a distance equal to the width of a bearing assembly. Annular space 35 lies between the fixed outer holding means and the rotatable internal axial holding means.

Figure 5:
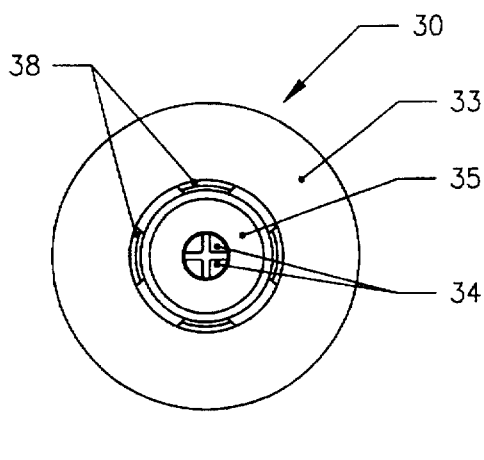
FIG. 5 is a front end elevation of the tool of FIG. 4.

FIG. 5 shows, in front elevation, hand-tool 30 head-on, as in a bottom plan of the FIG. 4 showing. Tapered housing portion 33 fills the outer part of the view. The quadrantal portions of rotatable internal holding means 34 occupy the central part of the view, and are separated by annular space 35 from fixed outer holding means 38.

Figure 6:
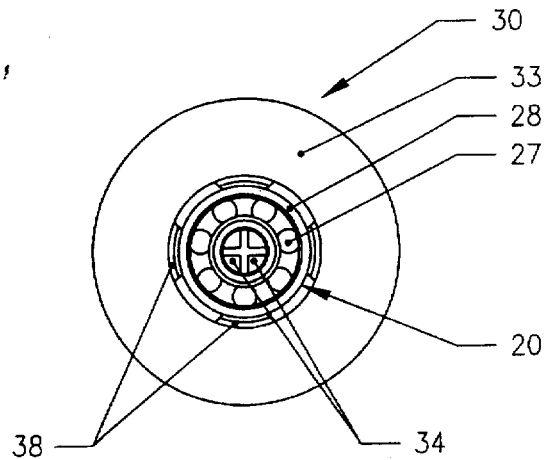
FIG. 6 is a front elevation of the same tool holding a bearing assembly for immersion into a body of cleansing liquid.

FIG. 6 shows hand-tool 30, in front or endwise elevation (head-on as in FIG. 5) except that now it is holding bearing assembly 20 between flexible inner rotatable holding means 34 and outer fixed holding means 38. The prior removal of the near dust cover exposes the ball bearings preparatory to cleansing of the bearings according to the invention. Outer race member 28 of the bearing assembly is in snug contact with fixed holding members 38, while inner race member 24 of the bearing assembly is in similarly snug contact with rotatable axial holding means 34.

Figure 7:
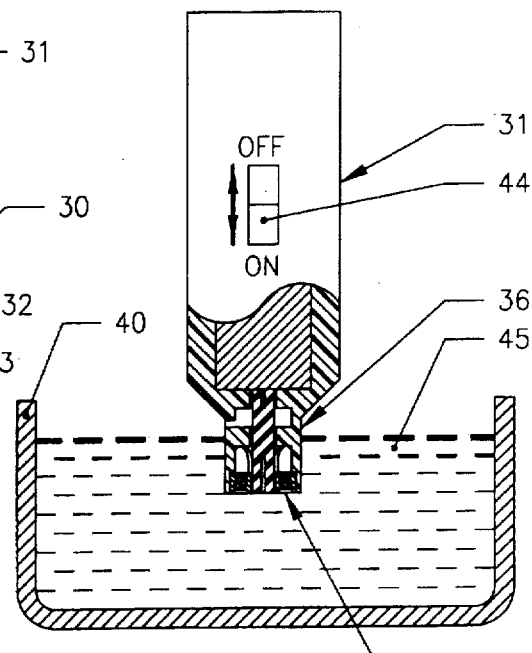
FIG. 7 is a side view of the same tool, similar to FIG. 4 but on a reduced scale, and holding a bearing assembly during treatment in cleansing liquid, according to this invention.

FIG. 7 shows, in side elevation (as in FIG. 4) same tool 30, now holding bearing assembly 20 reoriented substantially vertically (as in FIG. 4) but now over open-top container 40 containing cleansing liquid 45. Head 36 and the supported bearing assembly are immersed in the liquid. ON-OFF button 44 appears here on the housing body portion of the tool, as is customary with electric hand tools, being connected (not shown) to rotate the inner holding means in the ON position, which may be graduated for variable speed operation.

The operation of this invention to clean bearing assemblies is readily understood, in both apparatus and procedural aspects, from the foregoing description and a few additional explanatory remarks.

According to this invention, the tool is positioned to immerse the bearing assembly into the cleansing liquid to wet substantially the entire bearing assembly. Then the tool motor is switched on to rotate the inner race member by frictional contact with the flexible portions of the rotating axial holding means, increasingly tight as they flex outward centrifugally as the rotational speed increases. Meanwhile the outer race is held immovably by the circumferential holding means extending over a much greater area of frictional contact, whereupon the inner race member rotates relative to the fixed outer member, rotating the ball bearings and stirring the adjacent cleansing liquid vigorously. After only a few seconds of such treatment, the ball bearings and the races are thoroughly clean, free of their former lubricant and whatever contaminants they had picked up during usage in any normal or abnormal skating environment or even in careless handling or storage.

Residual liquid may be dried by bearing rotation in air after removal from the liquid and while still mounted on the tool, before re-installation in the wheel. Whereas re-oiling can be accomplished by dipping a bearing assembly so held into an appropriate lubricant, a more conservative practice is to apply the lubricant by dripping or spraying a controlled amount between the races and onto the ball bearings, as while holding the bearing assembly by hand. Replacing the removed dust covers is unnecessary, if two bearing assemblies, each with one dust cover in place, are re-installed in the wheel bore with their respective uncovered sides facing toward each other while the covered sides face the exterior, shown in the next view.

Figure 8:
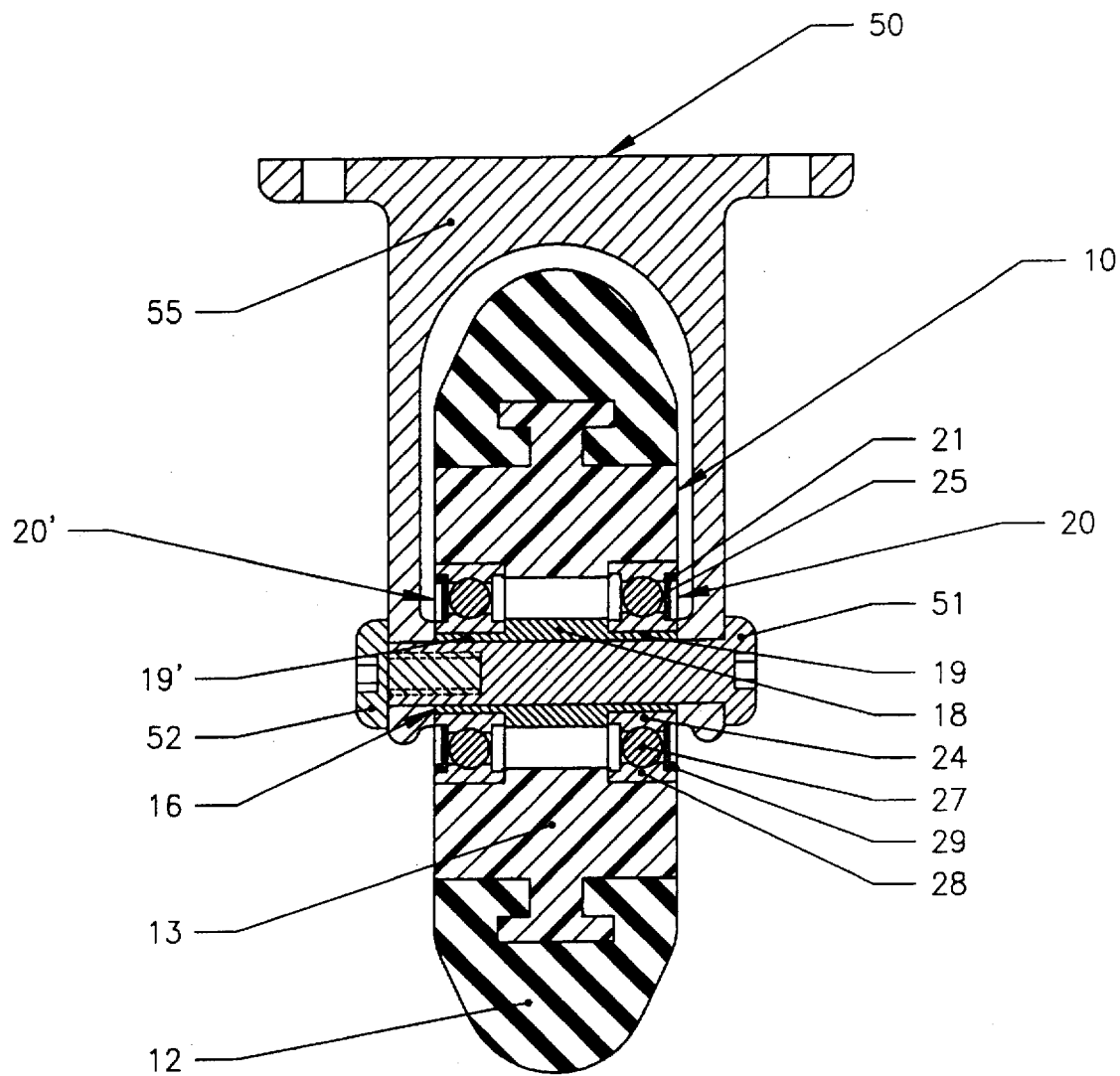
FIG. 8 is a sectional elevation of cleaned bearings reinstalled in a wheel remounted in operating orientation in a skate frame.

FIG. 8 shows, in transverse sectional elevation, same bearing assemblies 20, 20' re-assembled to same wheel 10, and the wheel re-assembled to a skate frame (50, shown fragmentarily). It will be understood that it is most convenient to re-install the bearing assemblies onto the respective ends of the sleevelike bushing with dust covers only on the outward facing sides leaving the ball bearings and their races reasonably well sealed off from the exterior in the hub but still more readily accessible for cleaning when removed.

Operationally, one of the bearings is press-fit into the wheel bore, then from the opposite side the bushing is inserted into the bore of the bearing, and then the other bearing is pressed over the bushing and into the wheel, which is inserted into yoke 55 of frame 50 with the wheel bore properly aligned to enable axle bolt 51 to be inserted through the yoke openings, and to receive screw 52 in its threaded open end, to complete the wheel axle assembly.

Both holding means of the tool of this invention may be varied in number of components, though the illustrated four components for each is both convenient and effective. The arcuate spacing of the respective members of the circumferential holding means apart from one another not only saves some component material but also enables flow of liquid into and around a bearing assembly held by the tool.

The hand-tool of this invention may be based upon the electric screw-driver, which has become a recognized article of commerce, by adding the fixed arcuate circumferential holding means made of any relatively stiff flexible material, preferably a composition not adversely affected by lubricating or cleansing liquids. Preferably a thermoplastic polyalkylene, such as high density polyethylene, or a thermosetting urea-formaldehyde polymer (Bakelite type) can be used.

Preferred embodiments and variants have been suggested for this invention. Other modifications may be made, as by adding, combining, deleting, or subdividing compositions, parts, or steps, while retaining all or some of the advantages and benefits of the present invention—which itself is defined in the following claims.

I claim:

1. Maintenance tool for skate wheel bearing assemblies removable from skate wheels and axles, each such assembly having an open-center annular axial inner race member, an annular outer race member, side covers, and ball bearings therebetween, comprising a tool having as mounting means:

circumferential means adapted to fit snugly about the outer race member of the assembly to hold it fixed, and rotatable axial means adapted to fit snugly within the central opening of the inner race member of the assembly and ending in a plurality of parallel flexible portions similar to one another, disposed similarly about the axis of the axle, and so adapted to flex centrifugally outward when rotating and thereby to grip the inner race member securely, and to rotate the inner race member relative to the fixed outer race member and thereby to rotate the ball bearings with the tool held in place; and a motor within the tool to rotate the latter means.

2. Maintenance apparatus for skate wheel bearing assemblies removable from skate wheels and axles, each such assembly having an open-center annular axial inner race member, an annular outer race member, side covers, and ball bearings therebetween, comprising a tool having as mounting means:

circumferential means adapted to fit snugly about the outer race member of the assembly to hold it fixed, including a plurality of arcuate members spaced from one another and together adapted to hold the peripheral surface of the outer race member fixed in place despite rotation of the inner race member by a motor in the tool; and axial means adapted to fit snugly within the central opening of the inner race member of the assembly and adapted to rotate the inner race member relative to the fixed outer race member and thereby to rotate the ball bearings with the tool held in place.

3. A rotary-drive hand-tool including a drive motor and comprising protruding axial means rotatable by the drive motor and adapted to fit snugly within an open-center inner race member of an annular ball bearing assembly, including a plurality of parallel flexible portions similar to one another, symmetrically disposed about the axis, and adapted to flex centrifugally outward when rotating, and thereby to hold the race member more securely; and protruding circumferential means fixed relative to the hand tool and adapted to fit snugly about the perimeter of an outer race member of the roller bearing assembly, whereby the tool is adapted to rotate the inner race member while holding the outer race member fixed, and thereby to rotate the roller bearings of the bearing assembly.

4. A rotary-drive hand-tool including a drive motor and comprising protruding axial means rotatable by the drive motor and adapted to fit snugly within an open-center inner race member of an annular ball bearing assembly; and protruding circumferential means fixed relative to the hand tool and adapted to fit snugly about the perimeter of an outer race member of the roller bearing assembly, and including a plurality of arcuately spaced portions similar to one another, adapted to flex outward to admit the outer race member therebetween but stiff enough to hold that outer race member fixed despite rotation of the inner race member;

whereby the tool is adapted to rotate the inner race member while holding the outer race member fixed, and thereby to rotate the roller bearings of the bearing assembly.

5. In apparatus for cleaning a roller bearing assembly having an open-center annular inner race member, and an annular outer race member with ball bearings retained therebetween, the improvement comprising means for temporarily holding one race fixed in position, and means for temporarily rotating the other race at the same time, while the assembly is immersed in a cleansing solution;

wherein the means for holding one race fixed is selectably in removable frictional contact with the outer race and effective to hold the outer race fixed while the assembly is so immersed; and wherein the means for holding the inner race rotatably is selectably in removable frictional contact with the inner race while the assembly is so immersed and includes a plurality of flexible members adapted to fit together within the open center of the inner race and about its axis and further adapted to flex outward under centrifugal force when the tool supporting head is in contact with the annular inner portion of the inner race and is being rotated by motive force while in such frictional contact.

6. The apparatus improvement according to claim 5, including motive means for applying motive force to rotate the inner race.

* * * * *